(12) United States Patent
Kim et al.

(10) Patent No.: US 8,616,008 B2
(45) Date of Patent: Dec. 31, 2013

(54) NON-FREEZING REFRIGERATOR

(75) Inventors: Su-Cheong Kim, Busan (KR);
Jong-Min Shin, Busan (KR); Su-Won Lee, Changwon (KR); Cheol-Hwan Kim, Gimhae (KR); Yong-Chol Kwon, Changwon (KR); Ku-Young Son, Busan (KR)

(73) Assignee: LG Electronics Inc., Seoul (KR)

( * ) Notice: Subject to any disclaimer, the term of this patent is extended or adjusted under 35 U.S.C. 154(b) by 805 days.

(21) Appl. No.: 12/279,507

(22) PCT Filed: Dec. 20, 2006

(86) PCT No.: PCT/KR2006/005605
§ 371 (c)(1),
(2), (4) Date: Jul. 30, 2009

(87) PCT Pub. No.: WO2007/094556
PCT Pub. Date: Aug. 23, 2007

(65) Prior Publication Data
US 2010/0229571 A1    Sep. 16, 2010

(30) Foreign Application Priority Data

Feb. 15, 2006  (KR) .................. 10-2006-0014692
Jul. 1, 2006   (KR) .................. 10-2006-0061683
Jul. 1, 2006   (KR) .................. 10-2006-0061687

(51) Int. Cl.
*F25B 21/00*    (2006.01)

(52) U.S. Cl.
USPC .................................. 62/3.1; 62/125; 62/426

(58) Field of Classification Search
USPC ............ 62/3.1, 426, 408, 449, 125, 190, 331, 62/132, 186, 382; 165/80.1; 99/467; 700/244

See application file for complete search history.

(56) References Cited

U.S. PATENT DOCUMENTS

| 4,881,590 | A | * | 11/1989 | Meier ........................ 165/48.1 |
| 5,230,220 | A | * | 7/1993  | Kang et al. .................... 62/78 |
| 5,468,454 | A | * | 11/1995 | Kim ............................ 422/121 |
| 5,501,084 | A | * | 3/1996  | Chang et al. .................. 62/264 |
| 5,608,643 | A | * | 3/1997  | Wichter et al. ............... 700/244 |
| 5,634,342 | A |   | 6/1997  | Peeters et al. |

(Continued)

FOREIGN PATENT DOCUMENTS

| CN | 1095635 C | 12/2002 |
| JP | 2225987 A | 9/1990 |

(Continued)

OTHER PUBLICATIONS

English language translation of JP-2002-364968-A (Dec. 18, 2002).

*Primary Examiner* — Mohammad M Ali
(74) *Attorney, Agent, or Firm* — Birch, Stewart, Kolasch & Birch, LLP

(57) ABSTRACT

The present invention discloses a non-freezing refrigerator which can keep the contents in a non-frozen state by an electric field. The non-freezing refrigerator includes a setting unit for selecting and setting a magnitude and frequency of a voltage, a generating unit for generating an electric field according to the voltage having the set magnitude and frequency, and applying the electric field to a storing space for storing the contents, and a freezing cycle for cooling the storing space. The contents are kept in the non-frozen state below a phase transition temperature.

18 Claims, 12 Drawing Sheets

(56) References Cited

U.S. PATENT DOCUMENTS

| | | |
|---|---|---|
| 5,699,668 A | 12/1997 | Cox |
| 5,907,953 A * | 6/1999 | Kang et al. .................. 62/89 |
| 5,946,919 A | 9/1999 | McKinney et al. |
| 6,131,393 A | 10/2000 | Greene |
| 6,250,087 B1 | 6/2001 | Owada et al. |
| 6,451,364 B1 | 9/2002 | Ito |
| 6,597,126 B1 * | 7/2003 | Parra ..................... 315/209 R |
| 6,604,369 B2 | 8/2003 | Seo |
| 6,786,058 B2 * | 9/2004 | Sanna ........................ 62/229 |
| 6,798,187 B1 * | 9/2004 | Czarnecki ............... 324/103 P |
| 6,938,432 B2 | 9/2005 | Enomoto |
| 6,996,920 B2 * | 2/2006 | Bang et al. .................. 34/494 |
| 7,401,469 B2 | 7/2008 | Joshi et al. |
| 7,966,842 B2 * | 6/2011 | Kamisako et al. ............ 62/373 |
| 2003/0068414 A1 | 4/2003 | Ito |
| 2003/0131620 A1 * | 7/2003 | Sanna ......................... 62/229 |
| 2004/0025527 A1 | 2/2004 | Takahashi et al. |
| 2004/0035128 A1 * | 2/2004 | Kaji et al. .................... 62/264 |
| 2005/0005611 A1 * | 1/2005 | Owada ......................... 62/3.1 |
| 2005/0132734 A1 | 6/2005 | Narayanamurthy et al. |

FOREIGN PATENT DOCUMENTS

| | | |
|---|---|---|
| JP | 5-93569 A | 4/1993 |
| JP | 6-257924 A | 9/1994 |
| JP | 2001-86967 A | 4/2001 |
| JP | 2001-241824 A | 9/2001 |
| JP | 2001-317849 A | 11/2001 |
| JP | 2002-364968 A | 12/2002 |
| JP | 2003-088347 A | 3/2003 |
| KR | 2000-0011081 A | 2/2000 |

* cited by examiner

O REFERENCE LINE (0W)
V FIFTH ENERGY LINE (0.36W)
IV FOURTH ENERGY LINE (0.62W)
III THIRD ENERGY LINE (0.91W)
II SECOND ENERGY LINE (0.98W)
I FIRST ENERGY LINE (1.38W)

US 8,616,008 B2

NON-FREEZING REFRIGERATOR

TECHNICAL FIELD

The present invention relates to a refrigerator, and more particularly, to a non-freezing refrigerator which can keep the contents in a non frozen state by an electric field generated by a radio frequency voltage.

BACKGROUND ART

In general, an electrostatic atmosphere is made in a refrigerator, and meats and fishes are thawed in the refrigerator at a minus temperature. In addition, fruits are kept fresh in the refrigerator.

This technology uses supercooling. Supercooling means that a molten object or a solid cooled below a phase transition temperature in a balanced state is not changed.

This technology is mentioned in Korea Laid-Open Patent Official Gazette 2000-0011081 disclosing an electrostatic field processing method, an electrostatic field processing apparatus, and electrodes therefor.

FIG. 1 is a structure view illustrating a conventional apparatus for thawing and freshness keeping. A cooling device 1 includes an insulation 2 and an outer wall 5. A temperature control device (not shown) is installed in the cooling device 1. A metal shelf 7 installed in the cooling device 1 has a two layer structure. Vegetables, meats or marine products are mounted on each layer for thawing, freshness keeping or ripening. The metal shelf 7 is isolated from the bottom of the cooling device 1 by insulators 9. A high voltage generating device 3 can generate 0 to 5000V of DC and AC voltages. The inner surface of the insulation 2 is covered with an insulating plate 2a such as vinyl chloride. A high voltage cable 4 for outputting the voltage of the high voltage generating device 3 accesses the metal shelf 7 through the outer wall 5 and the insulation 2.

When the user opens a door installed on the front surface of the cooling device 1, a safety switch 13 (refer to FIG. 2) is turned off to block the output of the high voltage generating device 3.

FIG. 2 is a circuit view illustrating the high voltage generating device 3. 100V of AC is supplied to a primary side of a voltage adjusting transformer 15. Reference numeral 11 denotes a power lamp and 19 denotes an operation state lamp. When the door 6 is closed and the safety switch 13 is on, a relay 14 is operated. The operation of the relay 14 is displayed by a relay operation lamp 12. Relay contact points 14a, 14b and 14c are closed by the operation of the relay 14, and 100V of AC is applied to the primary side of the voltage adjusting transformer 15.

The applied voltage is adjusted by an adjusting knob 15a at a secondary side of the voltage adjusting transformer 15. The adjusted voltage is displayed on a voltmeter. The adjusting knob 15a is connected to a primary side of a boosting transformer 17 at the secondary side of the voltage adjusting transformer 15. The boosting transformer 17 boosts a voltage at a rate of 1:50. For example, when 60V of voltage is applied, it is boosted to 3000V.

One end $O_1$ of the secondary side output of the boosting transformer 17 is connected to the metal shelf 7 isolated from the cooling device 1 through the high voltage cable 4, and the other end $O_2$ of the output is grounded. Since the outer wall 5 is grounded, if the user contacts the outer wall 5 of the cooling device 1, he/she does not receive an electric shock. In FIG. 1, the metal shelf 7 exposed in the cooling device 1 must be maintained in an insulated state. It is thus necessary to separate the metal shelf 7 from the walls of the cooling device 1 (the air performs insulation). If the contents 8 mounted on the metal shelf 7 contact the walls of the cooling device 1, the current flows to the ground through the walls of the cooling device 1. Drop of the applied voltage is prevented by adhering the insulating plate 2a to the inner walls. When the metal shelf 7 is not exposed but covered with vinyl chloride, an electric field atmosphere is made in the whole cooling device 1.

The conventional cooling device 1 controls only the magnitude of the voltage applied to the metal shelf 7 to supercool the foods. Accordingly, supercooling occurs at −5° C., to prevent freezing of the foods. In the case that the magnitude of the voltage is varied, a minimum temperature for generating supercooling is −5° C. The foods cannot be supercooled below −5° C.

In addition, the conventional art suggests generation of the non-frozen state using supercooling, but does not suggest the arrangement structure, shape and control of an electrode and a storing space for maintaining the non frozen state.

DISCLOSURE OF INVENTION

Technical Problem

The present invention is achieved to solve the above problems. An object of the present invention is to provide a non-freezing refrigerator which can lower a minimum temperature for generating supercooling.

Another object of the present invention is to provide a non-freezing refrigerator which uses an appropriate region of energy for keeping the contents in a non-frozen state, when the user intends to keep the contents in the non-frozen state.

Technical Solution

Yet another object of the present invention is to provide a non-freezing refrigerator which can efficiently perform non-freezing control according to a degree of load in a storing space.

Yet another object of the present invention is to provide a non-freezing refrigerator and a non-freezing keeping device which can continuously maintain a non-frozen state by the arrangement structure of an electrode and a storing space.

Yet another object of the present invention is to provide a non-freezing refrigerator and a non-freezing keeping device which can stably maintain a non-frozen state by shapes of an electrode and a storing space.

Yet another object of the present invention is to provide a non-freezing refrigerator and a non-freezing keeping device which can efficiently maintain a non-frozen state by controlling an electrode unit consisting of a plurality of electrode pairs.

In order to achieve the above-described objects of the invention, there is provided a non-freezing refrigerator, including: a setting unit for selecting and setting a magnitude and frequency of a voltage; a generating unit for generating an electric field according to the voltage having the set magnitude and frequency, and applying the electric field to a storing space for storing the contents; and a freezing cycle for cooling the storing space, whereby the contents are kept in a non-frozen state below a phase transition temperature.

In another aspect of the present invention, there is provided a non-freezing refrigerator, including: a keeping device having a storing space for storing the contents; an energy generating unit for generating a set magnitude of energy, and evenly applying the energy to the storing space; and a freezing cycle for cooling the storing space, whereby the contents are kept in a non-frozen state below a phase transition temperature.

In yet another aspect of the present invention, there is provided a non-freezing refrigerator, including: an insulating member having a storing space for storing the contents; a setting unit for setting a magnitude of a voltage having a radio frequency characteristic; an energy generating unit for generating energy based on the set voltage, and evenly applying the energy to the storing space; and a freezing cycle for cooling the storing space, whereby the contents are kept in a non-frozen state below a phase transition temperature.

In yet another aspect of the present invention, there is provided a non-freezing keeping device, including: an insulating member having a storing chamber for storing the contents; an electrode mounted at the side of the insulating member; and an isolating member for isolating the contents or the storing chamber from the ends of the electrode at a predetermined interval.

In yet another aspect of the present invention, there is provided a non-freezing keeping device, including: an insulating member having a rounded storing space for storing the contents; and at least one electrode mounted at the side of the insulating member.

In yet another aspect of the present invention, there is provided a non-freezing keeping device, including: a storing space for storing the contents; an electrode unit consisting of a plurality of electrode pairs symmetrically formed in the storing space; and a control unit for sequentially applying a voltage to the electrode pairs.

BRIEF DESCRIPTION OF THE DRAWINGS

The present invention will become better understood with reference to the accompanying drawings which are given only by way of illustration and thus are not limitative of the present invention, wherein.

MODE FOR THE INVENTION

A non-freezing refrigerator in accordance with the preferred embodiments of the present invention will now be described in detail with reference to the accompanying drawings.

Figure 1:
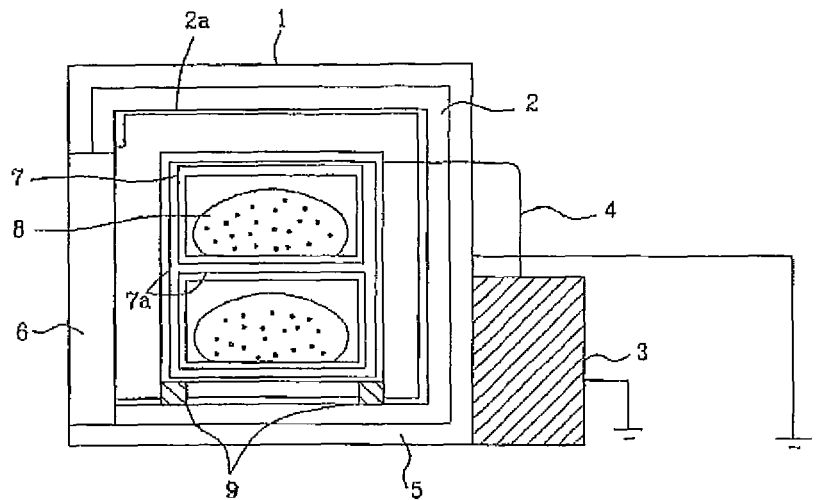
FIG. 1 is a structure view illustrating a conventional apparatus for thawing and freshness keeping.
Figure 2:
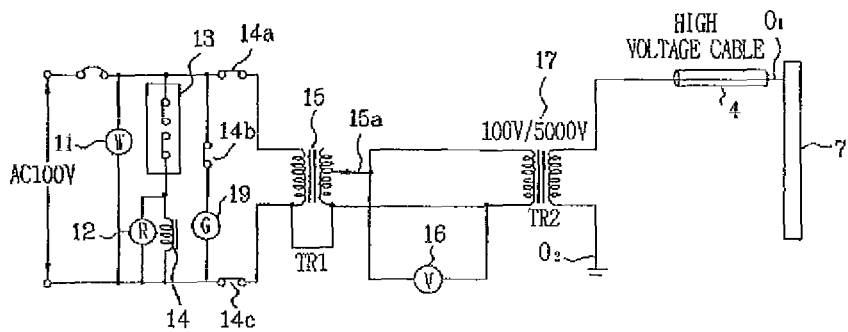
FIG. 2 is a circuit view illustrating a high voltage generating device of FIG. 1.
Figure 3:
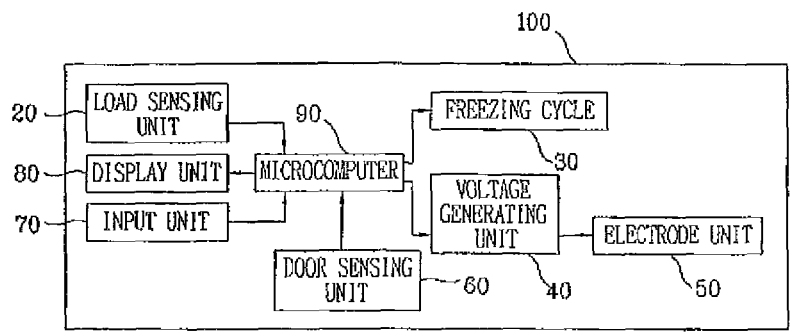
FIG. 3 is a block diagram illustrating a non-freezing refrigerator in accordance with the present invention.
Figure 4:
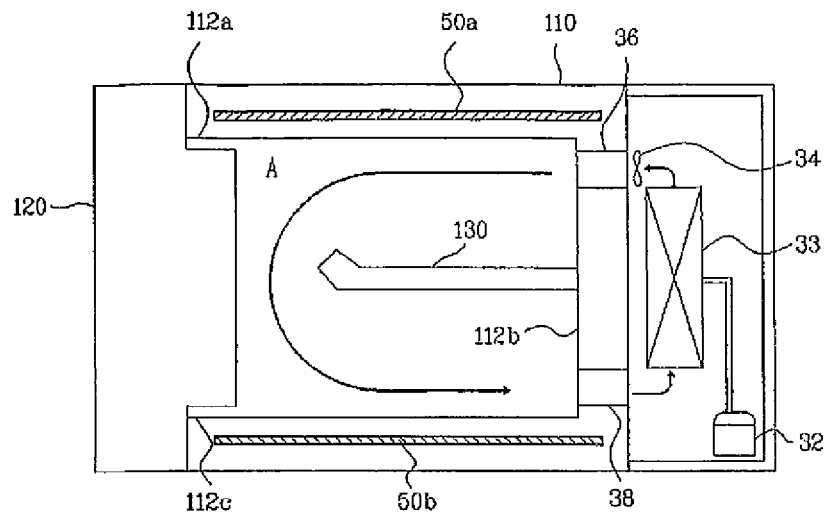
FIGS. 4 and 5 are structure views illustrating examples of the non-freezing refrigerator in accordance with the present invention.
Figure 5:
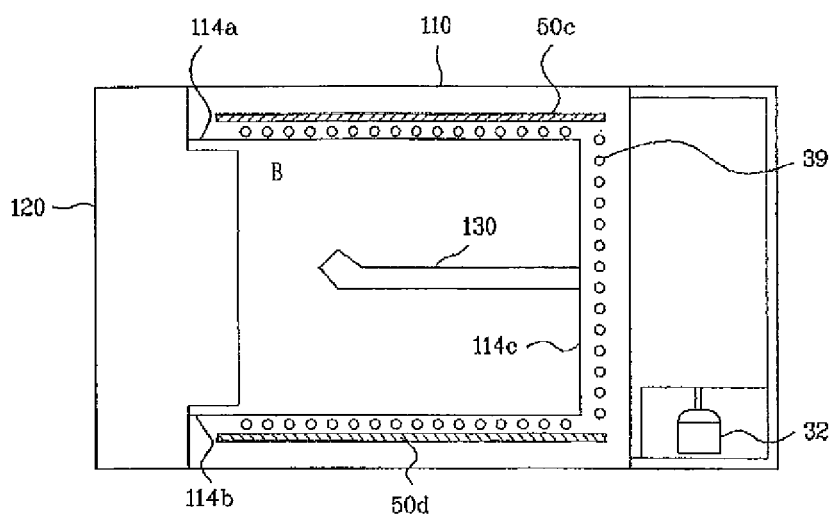

FIG. 3 is a block diagram illustrating the non-freezing refrigerator in accordance with the present invention, and FIGS. 4 and 5 are structure views illustrating examples of the non-freezing refrigerator in accordance with the present invention.

The non-freezing refrigerator 100 includes a load sensing unit 20 for sensing a state of a storing space A or B and a state of the contents (not shown) stored in the storing space A or B, a freezing cycle 30 for cooling the storing space A or B, a voltage generating unit 40 for generating a voltage to apply an electric field to the storing space A or B, an electrode unit 50 for receiving the voltage and generating the electric field, a door sensing unit 60 for sensing opening and closing of a door 120, an input unit 70 for enabling the user to input a degree of cooling or selection of a non-freezing mode, a display unit 80 for displaying an operation state of the non-freezing refrigerator 100, and a microcomputer 90 for controlling freezing or refrigerating of the non-freezing refrigerator 100, and executing the non-freezing mode using supercooling. A power supply unit (not shown) is essentially installed to supply power to the aforementioned elements. However, power supply is easily recognized by those skilled in the art, and thus explanations thereof are omitted.

In detail, the load sensing unit 20 senses or stores the state of the storing space A or B and the state of the contents stored in the storing space A or B, and transmits the sensing result to the microcomputer 90. For example, the load sensing unit 20 can be a thermometer for storing information on a capacity of the storing space A or B which is the state of the storing space A or B, or sensing a temperature of the storing space A or B or the contents, or a hardness meter, an ammeter, a voltmeter, a scale, an optical sensor (or laser sensor) or a pressure sensor for deciding whether the contents have been stored in the storing space A or B. Especially, the load sensing unit 20 can be the ammeter or the voltmeter. When the storing space A or B is empty and when the contents are stored in the storing space A and B, an electric field applied resistor has different resistance values. Therefore, whether the contents have been stored can be checked by the different resistance values. The microcomputer 90 confirms a quantity and a moisture content of the contents according to the resistance value from the load sensing unit 10, and identifies a kind of the contents having the moisture content.

The freezing cycle 30 is classified into indirect cooling and direct cooling according to a method of cooling the contents. FIG. 4 shows an indirect cooling type non-freezing refrigerator and FIG. 5 shows a direct cooling type non-freezing refrigerator, which will later be explained in detail.

The voltage generating unit 40 generates an AC voltage according to a predetermined magnitude and frequency. The voltage generating unit 40 can generate the AC voltage by varying at least one of the magnitude of the voltage and the frequency of the voltage. Especially, the voltage generating unit 40 applies the AC voltage to the electrode unit 50 according to the set values (voltage magnitude, voltage frequency, etc.) of the microcomputer 90, so that the resulting electric field can be applied to the storing space A or B. In accordance with the present invention, the voltage generating unit 40 can vary the magnitude of the voltage within the range of 500V to 15 kV by variably setting the frequency. Also, the voltage generating unit 40 variably sets the frequency of the voltage in a radio frequency region ranging from 1 to 500 kHz.

The electrode unit 50 converts the AC voltage from the voltage generating unit 40 into the electric field, and applies the electric field to the storing space A or B. Generally, the electrode unit 50 is a plate or conductive wire made of Cu or Pt.

Since the electric field applied to the storing space A or B or the contents by the electrode unit 50 originates from the radio frequency AC voltage, polarity of the electric field is varied according to the frequency. The water molecules containing O having polarity and H having + polarity are continuously vibrated, rotated and translated by the electric field, and thus maintained in the liquid phase below the phase transition temperature without crystallization.

If the voltage has a frequency below 1 kHz or a magnitude below 500V, the electrode unit 50 cannot pass through an insulating material in a casing 110. Even if rotation of water molecules of the contents is induced according to the frequency, the speed and vibration are weak, so that phase transition to a solid occurs at a phase transition temperature. Therefore, the voltage generating unit 40 uses the AC voltage having a frequency of a radio frequency band. In addition, the voltage over 15 kV may cause insulation damage to the non-freezing refrigerator 100. The AC voltage over 500 kHz does not generate the electric field in the electrode unit 50, but is emitted in the form of electric wave. As the variation speed of the polarity of the voltage is too fast, the motion of the water molecules does not follow the speed. Accordingly, the present invention generates and uses the AC voltage of the aforementioned magnitude and frequency regions. The voltage magnitude and frequency regions will be discussed later.

The door sensing unit 60 stops the operation of the voltage generating unit 40 by opening of the door 120 for opening and closing the storing space A or B. The door sensing unit 60 can notify opening to the microcomputer 90 to perform the stop operation, or stop the voltage generating unit 40 by shorting out power applied to the voltage generating unit 40.

The input unit 70 enables the user to input execution of the non-freezing mode for the storing space A or B or the contents as well as temperature setting for freezing and refrigerating control, and selection of a service type (flake ice, water, etc.) of a dispenser. In addition, the user can input information on the contents such as the kind of the contents through the input unit 70. The input unit 70 can be a barcode reader or an RFID reader for providing the information on the contents to the microcomputer 90.

The display unit 80 basically displays a freezing temperature, a refrigerating temperature and the service type of the dispenser, and additionally displays the current execution of the non-freezing mode.

The microcomputer 90 basically controls freezing and refrigerating, and further executes the non-freezing mode according to the present invention.

The microcomputer 90 enables the voltage generating unit 40 to generate the AC voltage having the set frequency and magnitude and apply the AC voltage to the electrode unit 50. In this case, the microcomputer 90 fixes the degree of load (for example, a resistance value, a current value, etc.) from the load sensing unit 20 to specific values, and makes the voltage generating unit 40 generate the AC voltage having the frequency and magnitude corresponding to the degree of load. In addition, it can be applied when the kind of the contents stored in the storing space A or B is preset (for example, a meat storing space, a vegetable storing space, a fruit storing space, a wine storing space, etc.).

In addition, the microcomputer 90 acquires the state of the storing space A or B or the state of the contents from the input unit 70 or the load sensing unit 20, and generates an AC voltage with a frequency and magnitude corresponding to the acquired information or the degree of load, thereby executing the artificial intelligent non-freezing mode.

When the microcomputer 90 executes the non-freezing mode, the microcomputer 90 can set or vary a non-freezing temperature for executing the non-freezing mode. Here, the microcomputer 90 can set or vary the non-freezing temperature according to relation between energy in cooling (energy taken from the contents) and energy applied by the electric field (energy supplied to the contents) discussed later.

FIGS. 4 and 5 are structure views illustrating examples of the non-freezing refrigerator in accordance with the present invention. FIG. 4 is a cross-sectional view illustrating an indirect cooling type non-freezing refrigerator, and FIG. 5 is a cross-sectional view illustrating a direct cooling type non-freezing refrigerator.

The indirect cooling type non-freezing refrigerator includes a casing 110 having one surface opened, and including a storing space A inside and a shelf 130 for partially partitioning the storing space A, and a door 120 for opening and closing the opened surface of the casing 110.

A freezing cycle 30 of the indirect cooling type non-freezing refrigerator includes a compressor 32 for compressing refrigerants, an evaporator 33 for generating cool air (indicated by arrows) for cooling the storing space A or the contents, a fan 34 for forcibly flowing the cool air, a suction duct 36 for supplying the cool air to the storing space A, and a discharge duct 38 for inducing the cool air passing through the storing space A to the evaporator 33. Although not illustrated, the freezing cycle 30 further includes a condenser, a drier and an expanding unit.

Electrode units 50*a* and 50*b* are formed between the inner surfaces 112*a* and 112*c* facing the storing space A and the outer surface of the casing 110. The electrode units 50*a* and 50*b* are installed to face the storing space A, for applying an electric field to the whole storing space A. The storing space A is separated from the ends of the electrode units 50*a* and 50*b* at predetermined intervals in the inner or center directions of the electrode units 50*a* and 50*b*, for applying a uniform electric field to the storing space A or the contents.

The suction duct 36 and the discharge duct 38 are formed on the inner surface 112*b* of the casing 110. The inner surfaces 112*a*, 112*b* and 112*c* of the casing 110 are made of a hydrophobic material, and thus not frozen during the non-freezing mode due to reduction of surface tension of water. The outer surface and the inner surfaces 112*a*, 112*b* and 112*c* of the casing 110 are made of an insulating material, thereby preventing the user from receiving an electric shock from the electrode units 50*a* and 50*b*, and preventing the contents from electrically contacting the electrode units 50*a* and 50*b* through the inner surfaces 112*a*, 112*b* and 112*c*.

A casing 110, a door 120 and a shelf 130 of the direct cooling type non-freezing refrigerator of FIG. 5 are identical to those of the indirect cooling type non-freezing refrigerator of FIG. 4. Inner surfaces 114*a*, 114*b* and 114*c* of the casing 110 are identical to the inner surfaces 112a, 112b and 112c of the casing 110 except for the suction duct 36 and the discharge duct 38.

A freezing cycle 30 of the direct cooling type non-freezing refrigerator of FIG. 5 includes a compressor 32 for compressing refrigerants, and an evaporator 39 installed in the casing 110 adjacently to the inner surfaces 114a, 114b and 114c of the casing 110 around the storing space B, for evaporating the refrigerants. The direct cooling type freezing cycle 30 includes a condenser (not shown) and an expansion valve (not shown).

Especially, electrode units 50a and 50d are inserted between the evaporator 39 and the casing 110, for preventing cool air from being intercepted by the evaporator 39.

Figure 6:
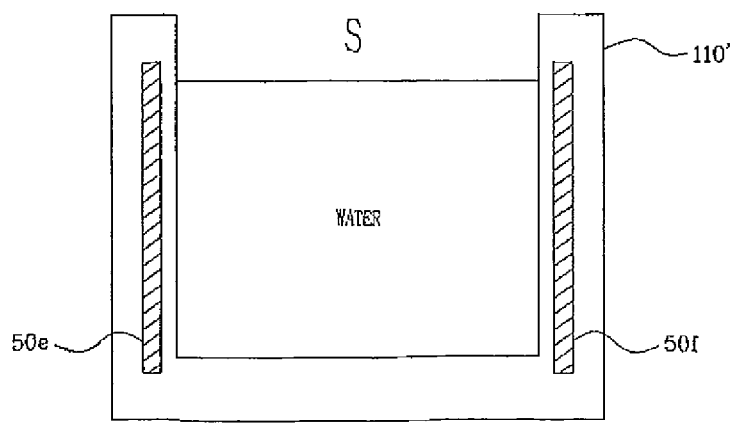
FIGS. 6 and 7 are an exemplary view and a graph showing supercooling in the non-freezing refrigerator in accordance with the present invention.
Figure 7:
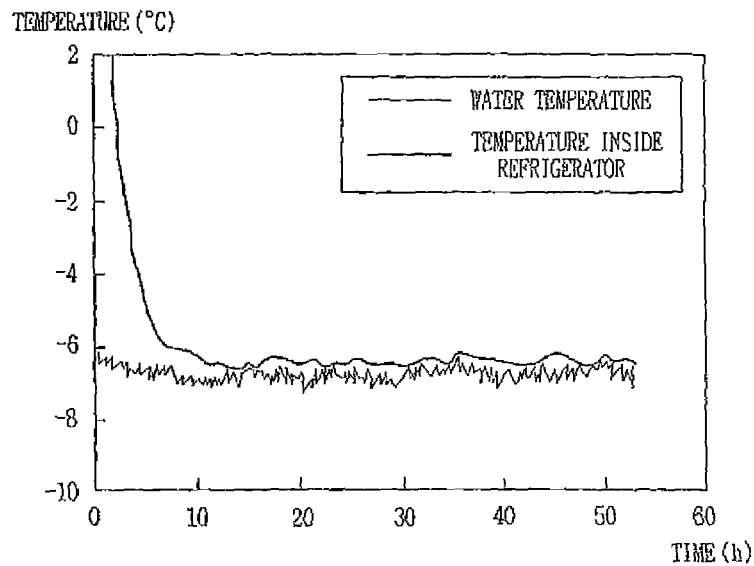

FIGS. 6 and 7 are an exemplary view and a graph showing supercooling in the non-freezing refrigerator in accordance with the present invention.

FIG. 6 shows an experiment structure and condition of FIG. 7. Referring to FIG. 7, a storing space S is formed in a casing 110', 0.1 l of distilled water is put into in the storing space S, and electrodes 50e and 50f are inserted into the sidewalls of the casing 110' to be symmetrical about the storing space S. The electrode surfaces of the electrodes 50e and 50f facing the storing surface S are wider than the surface of the storing space S. An interval between the electrodes 50e and 50f is 20 mm. The casing 110 is made of an acrylic material. The casing 110 is disposed and cooled in a storing space uniformly supplied with cool air (refrigerating device which does not have an additional electric field generator except the electrodes 50e and 50f).

Here, the microcomputer 90 makes the voltage generating unit 40 apply 0.91 kV (6.76 mA) and 20 kHz of Ac voltage to the electrode unit 50, and the temperature of the storing space is about −7° C.

As shown in the supercooling graph of FIG. 7, since the non-freezing refrigerator 100 generates supercooling at −6.5° C. below the phase transition temperature, it maintains the non-frozen state of water.

Figure 8:
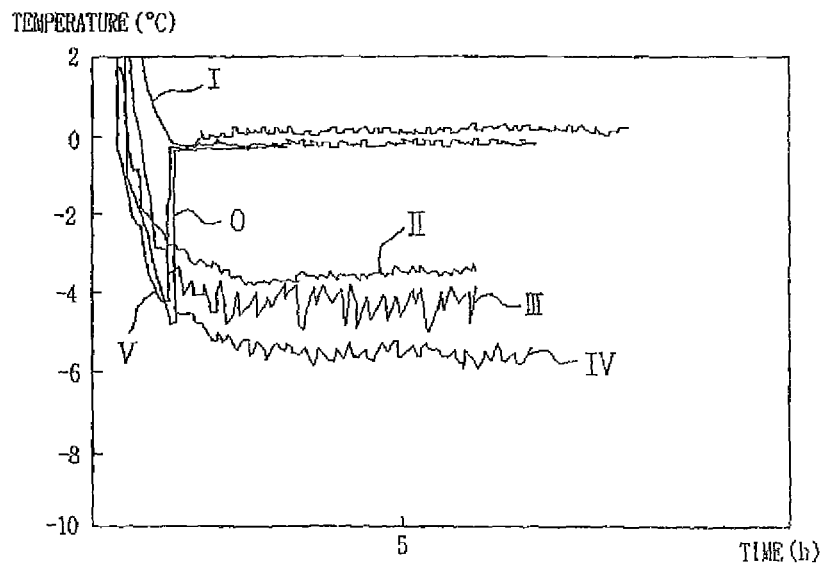
FIGS. 8 and 9 are graphs showing correlation between power and non-freezing temperature in the simplified non-freezing refrigerator in accordance with the present invention.
Figure 9:
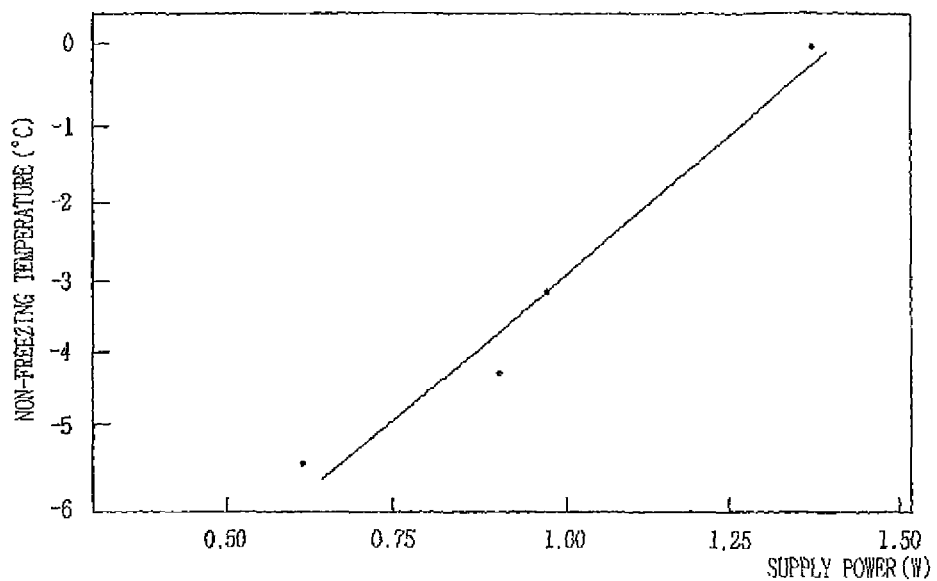

FIGS. 8 and 9 are graphs showing correlation between the power and the non-freezing temperature in the simplified non-freezing refrigerator in accordance with the present invention. FIGS. 8 and 9 are applied to the experiment structure of FIG. 6. The keeping temperature (control temperature) in the storing space in which the casing 110 is disposed, namely, the inside temperature is fixed to −6° C. Here, the microcomputer 90 sets and applies a plurality of quantities of power energy to the voltage generating unit 40, and measures resulting variations of the non-freezing temperature.

FIG. 8 is a graph showing the non-freezing temperature of water supplied with different quantities of power energy. As depicted in FIG. 8, in a reference line 0 which is not supplied with power energy, water is maintained in the non-frozen state to −5° C. by cooling, and phase-transited to the frozen state 3 hours from cooling.

In a first energy line I (1.38 W), since a quantity of energy applied to water is quite large, even if water is cooled at the phase transition temperature (0° C. in 1 air pressure), it is maintained at almost 0° C. and not supercooled.

In a second energy line II (0.98 W), water is maintained in the supercooled state, and the supercooling temperature ranges from −3 to −3.5° C.

In a third energy line III (0.91 W), water is maintained in the supercooled state, and the supercooling temperature ranges from −4 to −5° C.

In a fourth energy line IV (0.62 W), water is maintained in the supercooled state, and the supercooling temperature ranges from −5.5 to −5.8° C.

In a fifth energy line V (0.36 W), water is frozen (phase transition) without reaching the supercooled state.

FIG. 9 is a graph showing correlation between the first to fifth energy lines of FIG. 8. As shown in FIG. 9, in the cool air supply state, the quantity of the energy applied to the contents, namely, water and the non-freezing temperature of water have proportional relation. That is, when the quantity of the energy applied to the contents is large, the non-freezing temperature rises, and when the quantity of the energy applied to the contents is small, the non-freezing temperature falls. However, if the quantity of energy is too small, it does not cause the motion of the water molecules and adjust the supercooled state, thereby reaching the result of the fifth energy line.

In this experiment, the non-freezing temperature is determined according to the quantity of energy applied when the keeping temperature Indoor temperature, inside temperature) is −6° C. If the keeping temperature is changed, the quantity of the applied energy must be changed. When the keeping temperature is constant, the microcomputer 90 stores the simple correlation information between the quantity of energy and the non-freezing temperature. In the case that the keeping temperature is adjusted or varied, the microcomputer 90 must store the correlation information between the quantity of energy and the non-freezing temperature in consideration of the variations of the keeping temperature.

Figure 10:
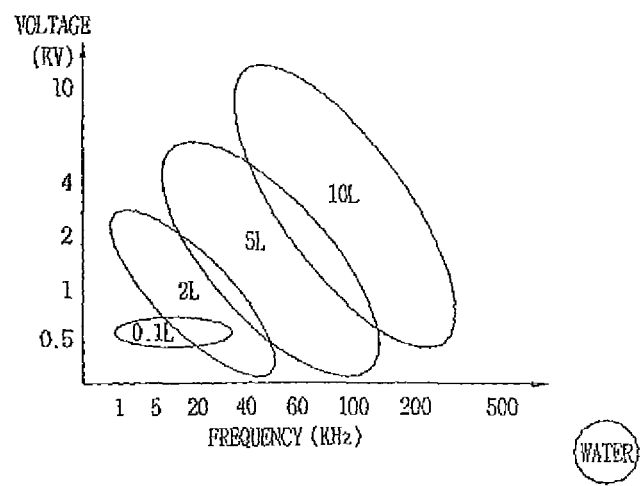
FIGS. 10 to 12 are graphs showing relation curves between a voltage and a frequency for maintaining a non-frozen state according to a degree of load.
Figure 11:
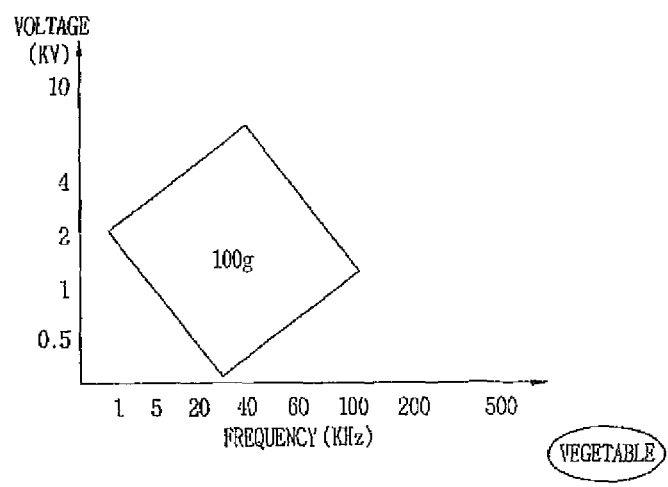
Figure 12:
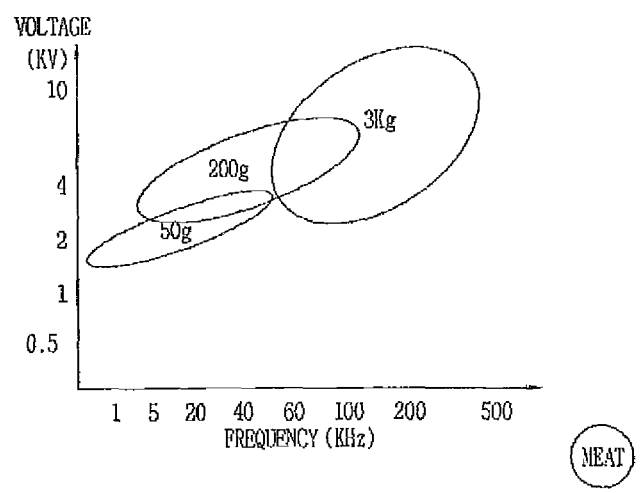

FIGS. 10 to 12 are graphs showing relation curves between the voltage and the frequency for maintaining the non frozen state according to the degree of load. In the case that the contents are contained in a plastic container and stored in the non-freezing refrigerator of FIG. 4 or 5, or contained in the casing 110 of FIG. 6 and non-freezing treated, each curve shows the voltage and frequency regions keeping the non-frozen state by supercooling.

FIG. 10 exemplifies water. As a quantity of water increases to 0.1 l, 2 l, 5 l and 10 l, when a voltage and a frequency are set in each region to maintain motion of water molecules, the non-frozen state is maintained.

FIG. 11 exemplifies vegetables and shows a voltage and frequency region maintaining the non-frozen state in the same condition as FIG. 10. When a quantity of vegetables is 100 g, the non-frozen state is maintained in the voltage and frequency region of FIG. 11.

FIG. 12 exemplifies meat and shows a voltage and frequency region maintaining the non-frozen state in the same condition as FIG. 10. As a quantity of meat increases to 50 g, 200 g and 3 kg, when a voltage and a frequency are set in each region, the non-frozen state is maintained.

The load is varied according to the quantity and kind of the contents. In setting the voltage setting regions (the magnitude and frequency of the voltage) for maintaining the non-frozen state of the contents, referring to FIGS. 10 to 12, if the voltage and frequency setting regions VFm are set within the range of 500V to 15 kV in magnitude and 1 to 500 kHz in frequency, the contents can be kept in the non-frozen state, regardless of variation in kind or quantity. In addition, if the optimum voltage and frequency setting regions VFo are set within the range of 600V to 7 kV in magnitude and 5 to 200 kHz in frequency, most of the contents can be kept in the non frozen state, regardless of the kind or quantity.

FIGS. 13 to 16 are structure views illustrating arrangement examples of electrodes and a storing space of a non-freezing keeping device in accordance with the present invention. The non-freezing keeping device has a non-freezing function, which can be a non-freezing refrigerator. In the examples of FIGS. 13 to 16, since an electric field is not evenly generated at the ends of the electrodes, the storing space is isolated from the ends of the electrodes at a predetermined interval, so that a relatively uniform electric field can be applied to the storing space, for stably maintaining the non-frozen state.

Figure 13:
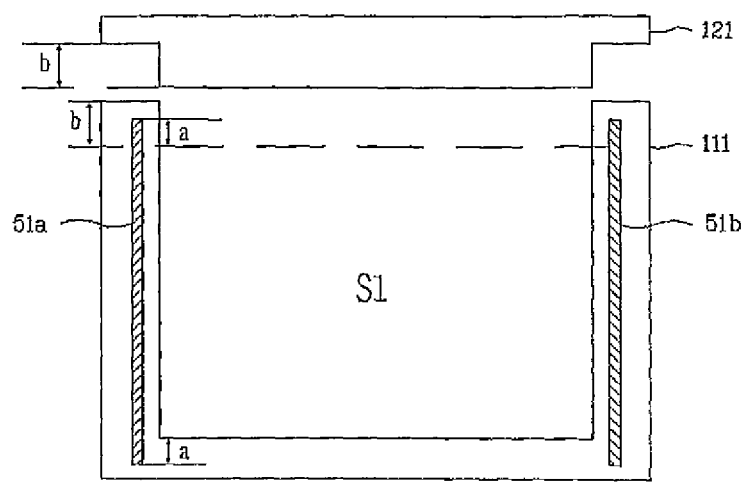
FIGS. 13 to 16 are structure views illustrating arrangement examples of electrodes and a storing space of a non-freezing keeping device in accordance with the present invention.

As illustrated in FIG. 13, the non-freezing keeping device includes a casing 111 being made of an insulating material and having a storing space S1, a cover 121 for opening and closing the opened side of the casing 111, the cover 121 having an insertion unit 121a inserted into the storing space S1, and electrodes 51a and 51b inserted into the sidewalls of the casing 111 to face the storing space S1. The inner bottom surface of the casing 111 is formed higher than the edges of the electrodes 51a and 51b by 'a', so that the lower portion of the storing space S1 can be isolated from the edges of the electrodes 51a and 51b at a predetermined interval. The insertion unit 121a of the cover 121 is inserted into the storing space S1 by 'a', so that the upper portion of the storing space S1 can be isolated from the edges of the electrodes 51a and 51b. The cooling structure of the non-freezing keeping device of FIG. 13 can be formed in the same manner as those of FIGS. 4 and 5, but is not illustrated in the drawing.

Figure 14:
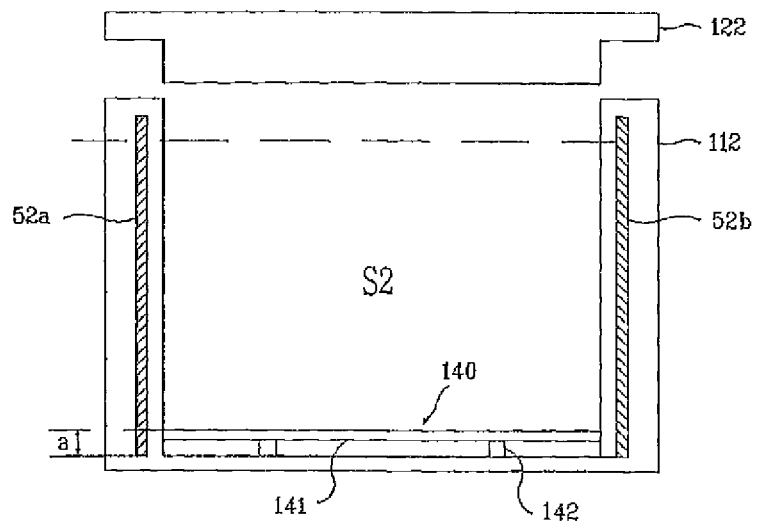

As shown in FIG. 14, edges of electrodes 52a and 52b of a casing 112 and a bottom surface of a storing space S2 are formed on the same surface. However, a support member 140 consisting of a support unit 142 and a rest unit 141 on which the contents are put, and having a height of a is inserted into the bottom surface of the storing space S2. Therefore, when the contents are stored in the storing space S2, the contents are isolated from the edges of the electrodes 52a and 52b y 'a'. The upper structure of the storing space S2 is identical to that of FIG. 13. That is, a cover 122 is identical in structure to the cover 121 of FIG. 13.The cooling structure of the non-freezing keeping device of FIG. 14 can be formed in the same manner as those of FIGS. 4 and 5, but is not illustrated in the drawing.

Figure 15:
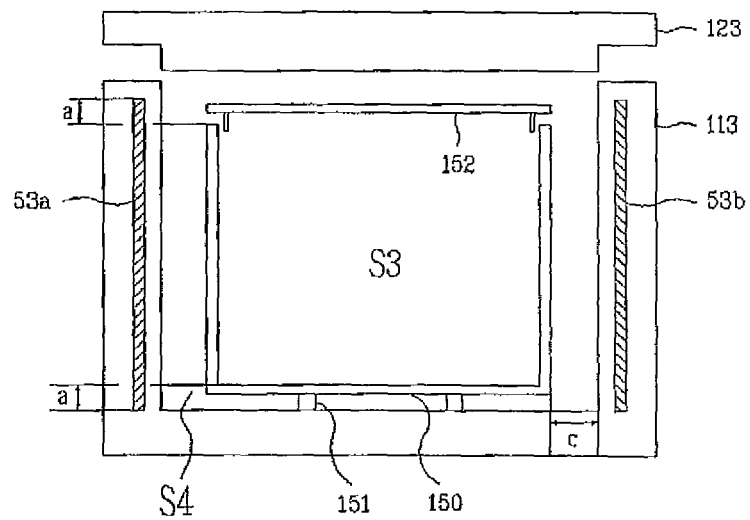

As depicted in FIG. 15, a casing 113, electrodes 53a and 53b and a cover 123 are identical to the casing 112, the electrodes 52a and 52b and the cover 122 of FIG. 14.However, an inner casing 150 (or inner bath) having a storing space S3 for storing the contents is inserted into a storing space S4 of the casing 113 (or outer bath). An outside diameter (or width) of the inner casing 150 is smaller than an inside diameter (or width) of the casing 113 by '2c'. A support unit 151 and a lower surface are formed on the bottom surface of the inner casing 150, so that the inner casing 150 can be insulated from the electrodes 53a and 53b by 'a'. A cover 152 for opening and closing the storing space S3 is formed on the top surface of the inner casing 150. The cover 152 includes a protruding unit 152a inserted into the inner casing 150, for preventing shaking of the cover 152. The sides of the inner casing 150 are formed lower than the edges of the electrodes 53a and 53b by 'a', so that the storing space S3 can be isolated from the electrodes 53a and 53b by 'a'.

The support unit 151 of the inner casing 150 is fixed to the inner bottom surface of the casing 113. Here, the outer surface of the inner casing 150 is isolated from the inner surface of the casing 113 by 'c'. As the inner casing 150 and the casing 113 are isolated from each other at a predetermined interval 'c', even if the cool air is supplied to the storing space S4 as shown in FIG. 4, or generated at the inner side portions of the casing 113 as shown in FIG. 5, the storing space S3 is evenly cooled without sharp temperature variation. As a result, when the non-frozen state is generated and maintained, the state of the contents is stabilized. Since the upper portion of the inner casing 150 is closed by the cover 152, the cool air is not transferred directly into the storing space S3. That is, the contents can be more evenly cooled by conduction.

Figure 16:
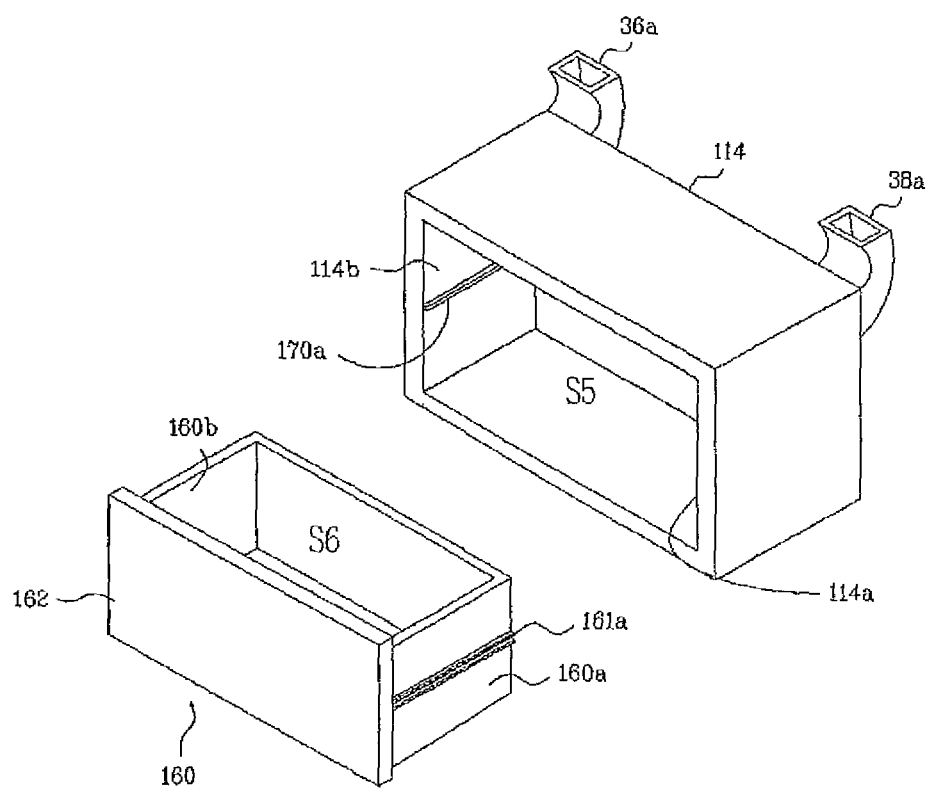

In the drawer structure of FIG. 16, the inner casing 150 of FIG. 15 is not fixed to the casing 113, but formed in a drawer type.

Referring to FIG. 16, a non-freezing keeping device includes a casing 114 having a storing space 85, the front portion of the casing 114 being opened, and a drawer 160 put into or taken out of the front portion of the casing 114. Electrodes (not shown) are inserted into side surfaces 114a and 114b of the casing 114 facing side units 160a and 160b of the drawer 160. A cool air inflow duct 36a for sucking the cool air, and a cool air discharge duct 38a for discharging the heat-exchanged cool air are formed at the upper portion of the casing 114.

The drawer 160 is formed in a square box shape with its upper portion opened. The drawer 160 includes a front end unit 162 with a predetermined thickness in a forward direction of a storing space S6. A pair of channel units 161a formed in a ⊏ shape are installed on the side units 160a and 160b of the drawer 160 in the horizontal direction. Rail units 170a are tinted on the inner sidewalls 114a and 114b of the casing 114 in the horizontal direction, and inserted into the channel units 161a, for slidably moving the drawer 160 in the front and rear directions. As the channel units 161a and the rail units 170a are coupled to each other, the storing space S6 is isolated from the electrodes at a predetermined interval, and also isolated from the sidewalls 114a and 114b of the casing 114 at a predetermined interval. Thus, the non-freezing keeping device of FIG. 16 attains the same effect as that of FIG. 15.

FIGS. 17 to 20 are concept views illustrating rounding of the storing space of the non-freezing keeping device in accordance with the present invention.

Figure 17:
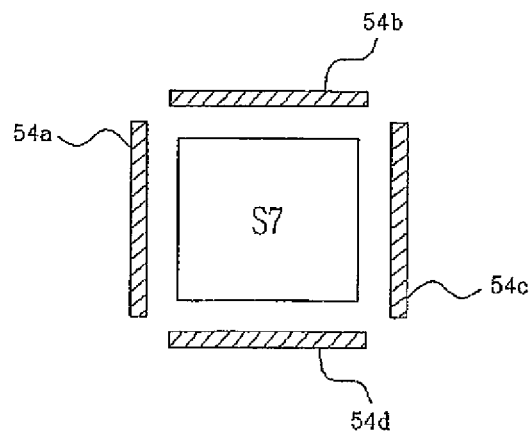
FIGS. 17 to 20 are concept views illustrating rounding of the storing space of the non-freezing keeping device in accordance with the present invention.

As illustrated in FIG. 17, ends of electrodes 54a to 54d correspond to edges of a storing space S7, respectively. In this arrangement, the intensity of an electric field applied to the edges and the inner portion of the storing space S7 is not uniform. Especially when a liquid such as water is stored, the edges are intensively cooled. Accordingly, a difference between a temperature of the edges and an inner temperature of the storing space S7 increases. If mixing of the contents (water) such as a convection occurs, the non-frozen state of water becomes unstable. In this case, cores are generated in water molecules of the contents, so that water may be super-cooling-released and frozen.

Figure 18:
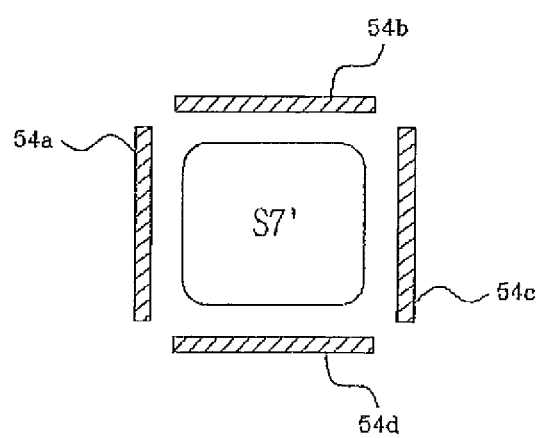

The structure and arrangement of electrodes 54a to 54d of FIG. 18 are identical to those of FIG. 17. However, all edges of a storing space S7 are rounded. The rounded portions of the storing space S7 are isolated from the ends of the electrodes 54a to 54d at predetermined intervals, thereby evenly receiving an electric field. As compared with the storing space S7 of FIG. 17, the storing space S7 is uniformly cooled and the non-frozen state is stabilized.

Figure 19:
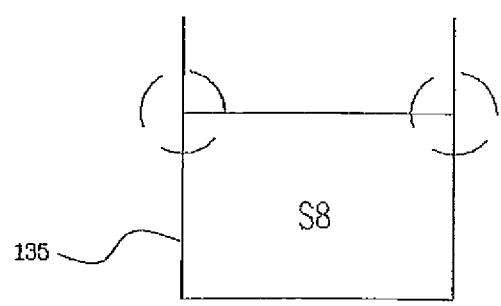

As shown in FIG. 19, a storing space S8 is formed in a cylindrical shape. When the storing space S8 is filled with water or liquid, as indicated by dotted lines, the water or liquid becomes higher than the water surface at the side portion of the storing space S8 due to cohesive power, and thus is cooled by the cool air faster than the inner portion of the storing space S8. Such uneven cooling makes the non-frozen state unstable.

Figure 20:
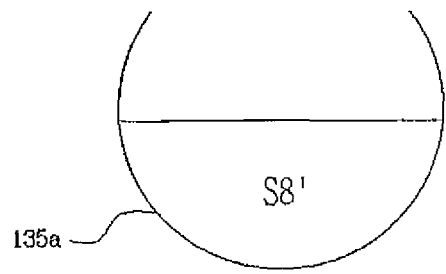

As depicted in FIG. 20, a globular storing space S8 is formed by rounding the storing space S8 of FIG. 19. Here, water or liquid stored in the storing space S8 does not rise over the water surface by cohesive power as in FIG. 19. Accordingly, the whole storing space S8 can be evenly cooled.

Figure 21:
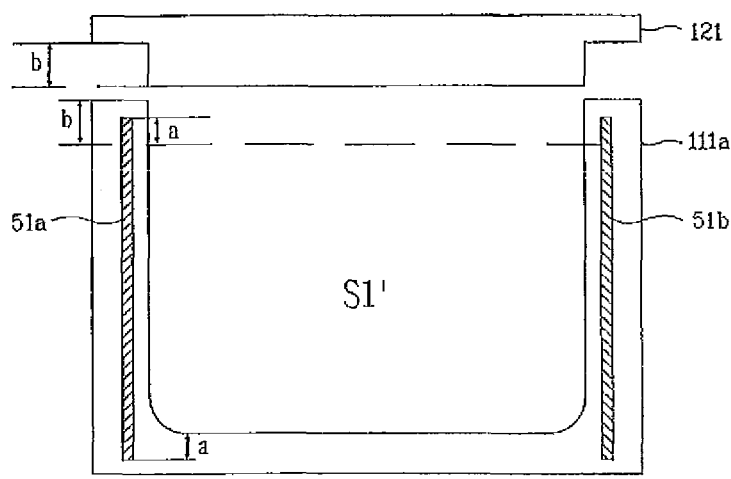
FIGS. 21 to 23 are exemplary views illustrating the rounded storing spaces of FIGS. 13 to 15.
Figure 22:
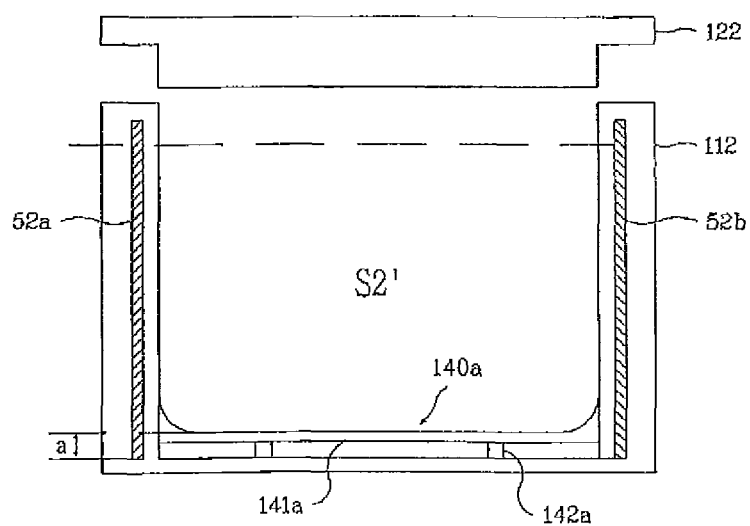
Figure 23:
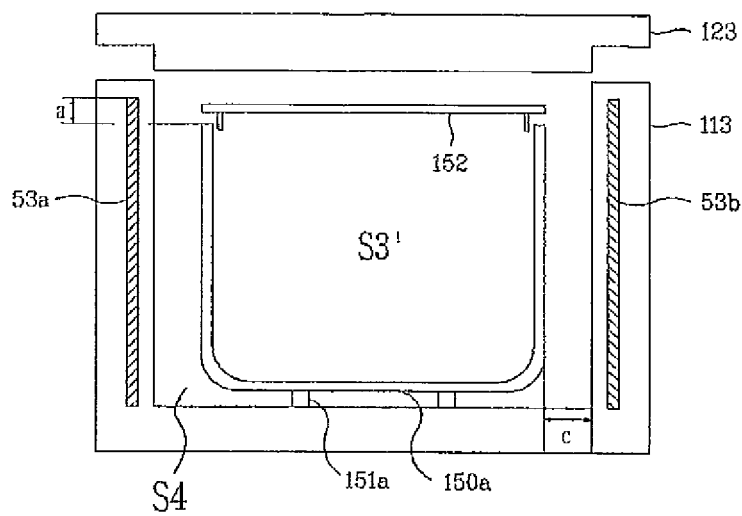

FIGS. 21 to 23 are exemplary views illustrating the rounded storing spaces of FIGS. 13 to 15. In FIG. 21, a storing space S1 is rounded by rounding inner bottom and side surfaces of a casing 111a. In FIG. 22, a storing space S2 is rounded by rounding both ends of a rest unit 141a of a support member 140a. In FIG. 23, a storing space S3 is rounded by rounding inner bottom and side surfaces of an inner casing 150a.

Figure 24:
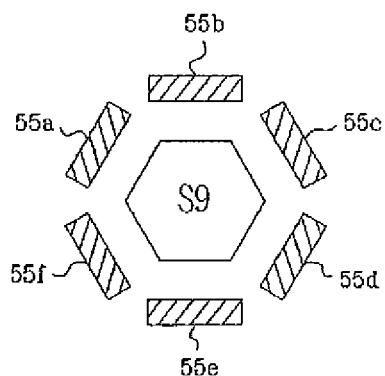
FIGS. 24 and 25 are exemplary views illustrating the rounded electrodes and storing spaces.
Figure 25:
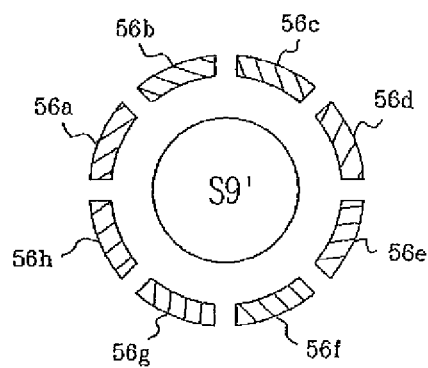

FIGS. 24 and 25 are exemplary views illustrating the rounded electrodes and storing spaces.

In FIG. 24, six electrodes 55a to 55f are arranged to tee a hexagonal column-shaped storing space S9. The intensity of the electric field and cooling are not uniform at the edges of the storing space S9. That is, the non frozen state is unstable.

In FIG. 25, an inner storing space S9 is rounded in a circular shape, and electrodes 56a to 56h are rounded. The electrodes 56a to 56h maintain regular intervals from the whole outer surface of the storing space S9, thereby stabilizing the non-frozen state.

Figure 26:
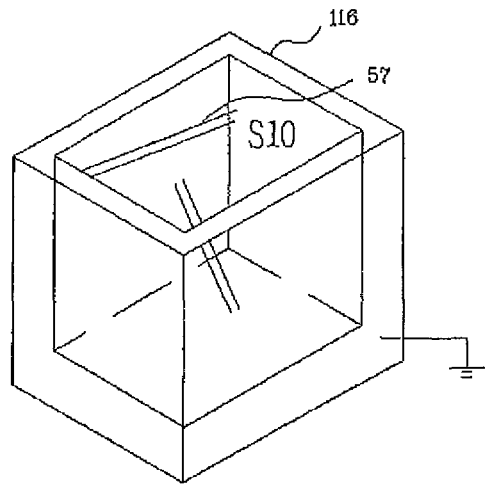
FIGS. 26 to 28 are exemplary views illustrating one example of the electrode of the non-freezing keeping device in accordance with the present invention.
Figure 27:
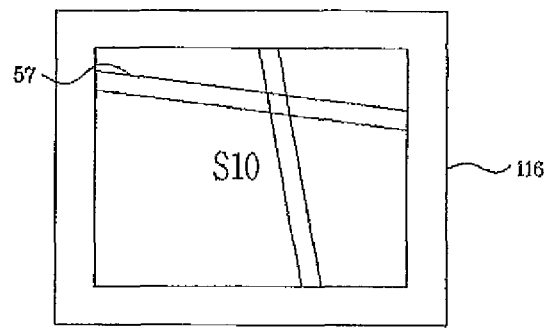
Figure 28:
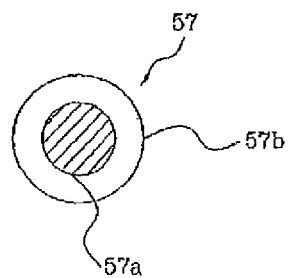

FIGS. 26 to 28 are exemplary views illustrating one example of the electrode of the non-freezing keeping device in accordance with the present invention. Here, an electrode line 57 is inserted into a casing 116.

Referring to FIGS. 26 to 28, the casing 116 has a storing space S10, and the electrode line 57 passes through the storing space S10. An electric field can be evenly applied to the storing space S10 through the electrode line 57. As shown in FIG. 28, the electrode line 57 includes a conducting line 57a, and an insulating material 57b for covering the conducting line 57a. The outer surface of the casing 116 is grounded.

Figure 29:
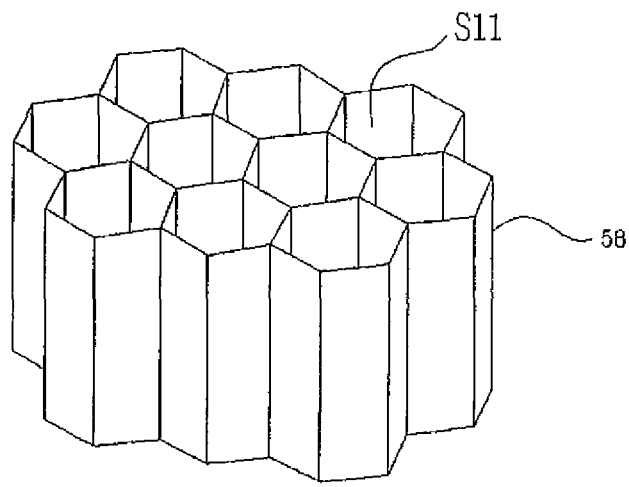
FIG. 29 is an exemplary view illustrating another example of the electrode of the non-freezing keeping device in accordance with the present invention.

FIG. 29 is an exemplary view illustrating another example of the electrode of the non-freezing keeping device in accordance with the present invention. As illustrated in FIG. 29, an electrode 58 is inserted into the casing 116 of FIG. 26, for applying an electric field. The electrode 58 is formed in a solid shape with a hexagonal column space S11. Water or liquid is filled in the hexagonal column space S11, for receiving the electric field. The hexagonal column space S11 applies the uniform electric field to the contents. Even if external force is applied to the casing 116, the contents stored in the hexagonal column space S11 are less shaken. As a result, the non-frozen state of the contents is stably maintained.

Figure 30:
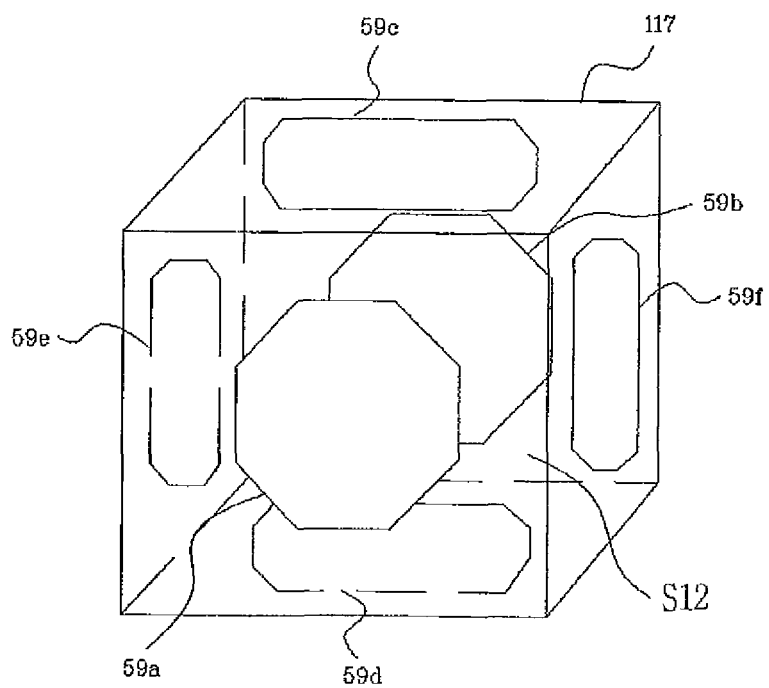
FIG. 30 is an exemplary view illustrating yet another example of the electrode of the non-freezing keeping device in accordance with the present invention.

FIG. 30 is an exemplary view illustrating yet another example of the electrode of the non-freezing keeping device in accordance with the present invention. As depicted in FIG. 30, the non-freezing keeping device includes a hexahedral casing 117 having a storing space S12, and electrodes 59a to 59f inserted into the surfaces of the casing 117, respectively, and symmetrically disposed about the center of the storing space S12. The electrodes 59a and 59b, 59c and 59d, and 59e and 59f are arranged in pairs. The voltage generating unit 40 sequentially applies a voltage to the first electrode pair 59a and 59b, the second electrode pair 59c and 59d, and the third electrode pair 59e and 59f for a predetermined time, thereby changing a direction of an electric field in the storing space S12. Accordingly, motion of water molecules in the contents is activated, so that the non-frozen state can be stabilized at a lower temperature.

The microcomputer 90 controls the voltage generating unit 40 to sequentially apply the voltage to the electrode pairs 59a and 59b, 59c and 59d, and 59e and 59f. In each application, the microcomputer 90 can set an OFF section which does not supply the voltage. For example, in a state where the whole electrode pairs 59a and 59b, 59c and 59d, and 59e and 59f are off, the microcomputer 90 can turn on the first electrode pair 59a and 59b, turn of the first electrode pair 59a and 59b after a predetermined time, turn on the second electrode pair 59c and 59d after a predetermined time, and turn off the second electrode pair 59c and 59d after a predetermined time. The motion of water molecules can be maintained for a predetermined time by one electrode pair, thereby reducing power consumption.

In accordance with the present invention, the non-freezing refrigerator can lower the minimum temperature for generating supercooling, thereby variously controlling and keeping the non-frozen state.

When the user intends to keep the contents in the non frozen state, the non-freezing refrigerator uses the appropriate region of energy for keeping the contents in the non-frozen state. As a result, the present invention can be easily applied to individual electric apparatuses.

The non-freezing refrigerator can stably maintain the non-frozen state and reduce power consumption by controlling the non-freezing state according to the degree of load in the storing space.

The non-freezing refrigerator can generate and continuously maintain the non-frozen state by the arrangement structure of the electrode and the storing space.

The non-freezing refrigerator can rapidly stabilize the non-frozen state by the shapes of the electrode and the storing space.

The non-freezing refrigerator can stably maintain the non-frozen state by applying the uniform electric field and evenly performing cooling.

The non-freezing refrigerator can stably maintain the non-frozen state by preventing shaking of the contents by external force.

The non-freezing refrigerator can efficiently maintain the non-frozen state and reduce the power consumption by controlling the electrode unit consisting of the plurality of electrode pairs.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A non-freezing refrigerator, comprising:
   a casing having a storing space for storing contents, wherein the front portion of the casing is opened;
   a drawer put into or taken out of the front portion of the casing;
   an electrode inserted into a side surface of the casing for generating a set magnitude of energy, and evenly applying the energy to the storing space;
   a load sensing unit for sensing a state of the contents stored in the storing space;
   a microcomputer for setting a magnitude and frequency of a voltage according to an output of the load sensing unit;
   a freezing cycle for cooling the storing space; and
   a cool air duct for sucking or discharging the cool air by a freezing cycle formed at the casing,
   whereby the contents are kept in a non-frozen state below a phase transition temperature.

2. The non-freezing refrigerator of claim 1, wherein the electrode generates and applies an electric field.

3. The non-freezing refrigerator of claim 1, wherein the electrode is mounted at the side of the keeping device, and
   wherein the contents or the storing space is isolated from the electrode at a predetermined interval.

4. The non-freezing refrigerator of claim 1, wherein the microcomputer sets a magnitude of energy according to a magnitude and frequency of a voltage.

5. The non-freezing refrigerator of claim 4, wherein the microcomputer selects and sets the magnitude and frequency within a voltage setting region.

6. The non-freezing refrigerator of claim 5, wherein the voltage setting region comprises a magnitude region ranging from 500V to 15 kV and a frequency region ranging from 1 to 500 kHz.

7. The non-freezing refrigerator of claim 6, wherein the voltage setting region comprises a magnitude region ranging from 600V to 7 kV and a frequency region ranging from 5 to 200 kHz.

8. The non-freezing refrigerator of claim 1, wherein the load sensing unit determines the quantity and moisture content of the contents.

9. A non-freezing refrigerator, comprising:
   an insulating member having a storing space for storing contents;
   a load sensing unit for sensing a state of the contents;
   a microcomputer for setting a magnitude of a voltage having a radio frequency characteristic according to the state of the contents sensed by the load sensing unit;
   an electrode for generating energy based on the set voltage, and evenly applying the energy to the storing space;
   a freezing cycle for cooling the storing space; and
   a cool air duct for sucking or discharging the cool air by a freezing cycle formed at the casing,
   whereby the contents are kept in a non-frozen state below a phase transition temperature.

10. The non-freezing refrigerator of claim 9, wherein the microcomputer selects the frequency of the voltage from a radio frequency region.

11. The non-freezing refrigerator of claim 9, wherein the load sensing unit determines the quantity and moisture content of the contents.

12. A non-freezing keeping device, comprising:
   an insulating member having a storing chamber for storing contents;
   an electrode mounted at the side of the insulating member; and
   a cool air duct for sucking or discharging the cool air by a freezing cycle formed at the casing,
   wherein the contents or the storing chamber is isolated from edges of the electrode at a predetermined interval.

13. The non-freezing keeping device of claim 12, wherein an inner unit of the insulating member isolates the storing chamber at the pre-determined interval.

14. The non-freezing keeping device of claim 12, wherein a support unit isolates the contents at the predetermined interval and supporting the contents.

15. The non-freezing keeping device of claim 12, wherein a bath disposed in the storing chamber, for storing the contents, is fixed to the insulating member by a support unit, and isolates the contents at the predetermined interval and supports the contents.

16. The non-freezing keeping device of claim 15, wherein the side surfaces of the bath are isolated from the insulating member.

17. The non-freezing keeping device of claim 12, wherein the inner surface of the insulating member is made of a hydrophobic material.

18. A non-freezing keeping device, comprising:
   a casing having a storing space for storing contents, wherein the front portion of the casing is opened;
   a drawer put into or taken out of the front portion of the casing;
   an electrode inserted into side surfaces of the casing; and
   a cool air duct for sucking or discharging the cool air by a freezing cycle formed at the casing,
   wherein the drawer isolates the contents at the predetermined interval from the electrode and supports the contents.

* * * * *